J. J. RIGBY.
SOLDER CARRYING CAN CAP.
APPLICATION FILED JUNE 1, 1907.
901,375.
Patented Oct. 20, 1908.
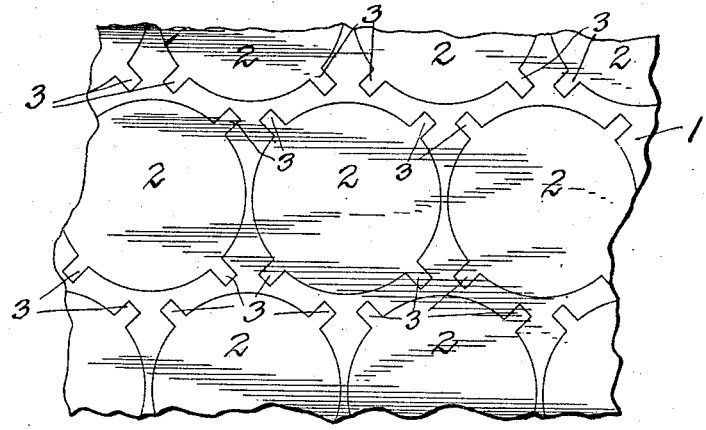
Fig. 1.
Fig. 2.
Fig. 3.
Fig. 4.
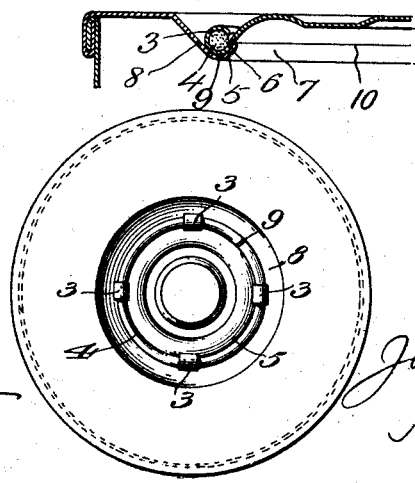
Fig. 5.
WITNESSES
INVENTOR
John J. Rigby
BY
ATTORNEY

UNITED STATES PATENT OFFICE.

JOHN J. RIGBY, OF NEW YORK, N. Y.

SOLDER-CARRYING CAN-CAP.

No. 901,375.        Specification of Letters Patent.        Patented Oct. 20, 1908.

Application filed June 1, 1907. Serial No. 376,875.

*To all whom it may concern:*

Be it known that I, JOHN J. RIGBY, a citizen of the United States of America, and a resident of New York city, borough of Brooklyn, county of Kings, and State of New York, have invented certain new and useful Improvements in Solder-Carrying Can-Caps, of which the following is a specification.

The present invention relates to solder carrying can caps, such as are used to close the filling hole of fruit and other cans. Caps of this character are provided with a body of solder on the lower edge of their dependent flange, and, after the cap is placed in position on the can, a soldering iron is applied thereby fusing the solder and sealing the cap to the can.

Heretofore it has been customary to provide the lower edge of the flange with a body of solder both on its exterior and interior, the result of which is that the cap cannot fit snugly against its adjacent shoulder on the can, and further, when the solder is fused, it will have a tendency to flow upward on the inside of the dependent flange and into the interior of the can. In a prior application filed by me on the 25th day of May 1907, Serial No. 375,578 this condition is obviated by carrying the body of solder entirely on the outside of the dependent flange. The specific means disclosed in said application to support and hold the body of solder in position, however, necessitated the use of a larger blank than is commonly employed.

The object of the present invention is to produce a can cap which will carry the solder on the exterior of its dependent flange without the necessity of making the blanks larger than the size ordinarily employed.

To this end the invention consists of the features of construction hereinafter set forth.

In the accompanying drawings the invention is embodied in a concrete and preferred form, but changes of construction may of course be made without departing from the intended and legitimate scope of the invention.

In the said drawings:—Figure 1 is a plan view of the sheet from which the blanks are cut. Figs. 2 and 3 are vertical sectional views through the finished cap showing the solder in position. Fig. 4 is a vertical sectional view through a portion of the can with the cap in position. Fig. 5 is a plan view of the cap with the solder in position.

Similar characters of reference indicate corresponding parts in the several views.

1 indicates the sheet from which the blanks are cut, showing the ordinary method employed in cutting out the blanks 2. It will be noticed that a certain amount of scrap is left between the blanks. I take advantage of this fact to provide the blanks with integral tongues or projections 3. When this blank is shaped, a body or ring of solder 4 will be supported and held in position on the exterior of the dependent flange 5 of the cap by bending the tongues 3 upwardly and inwardly over the solder. This will support and hold the solder at intervals circumferentially but leaving the greater part of the solder exposed.

In Fig. 4 the cap is shown in position on the can in the groove 9 surrounding the aperture or filling hole 10. It will be noticed that the interior surface 6 of the dependent flange 5 abuts against the inner wall 7 of the groove 10, there being no solder between the two. The tongues 3 cover the solder only at intervals so that when heat is applied the solder is free to run into the groove 10 thereby forming an exterior seal between the outer wall 8 of the said groove 10 and the dependent flange 5 of the cap.

What is claimed is:—

1. A can cap having a dependent flange, a body of solder on said flange, and tongues formed integral with said flange at its lower end adapted to support the solder, and bent upward and inward over the solder so as to hold it in position.

2. A can cap having a dependent flange, a body of solder located entirely on the exterior of said flange, and tongues formed integral with said flange at its lower end adapted to support the solder, and bent upward and inward over the solder so as to hold it in position.

3. A can cap having a dependent flange, a body of solder carried by said flange, and means on the flange for supporting and holding the solder at intervals circumferentially but leaving the greater part of the solder exposed.

4. A can cap having a dependent flange, a body of solder located entirely on the exterior of said flange, and means on the flange for supporting and holding the solder at intervals circumferentially but leaving the greater part of the solder exposed.

5. The combination with a can having an aperture surrounded by a groove, of a solder carrying can cap, having integral tongues at intervals circumferentially, supporting and holding a body of solder by being bent upward and inward, the cap resting in the groove aforesaid with its dependent flange abutting against the inner wall of the groove, whereby the solder, when fused, will form an exterior seal between the outer wall of the groove and the dependent flange of the cap.

Signed at New York city this 25 day of May 1907.

JOHN J. RIGBY.

Witnesses:
   AXEL V. BEEKEN,
   GEO. A. MARSHALL.